(12) United States Patent
Mykytiuk

(10) Patent No.: US 11,952,301 B2
(45) Date of Patent: Apr. 9, 2024

(54) SYSTEM FOR TREATMENT AND DISINFECTION OF INDUSTRIAL EFFLUENTS

(71) Applicant: Unique Equipment Solutions LLC, Littleton, MA (US)

(72) Inventor: Oleksandr Yuriiovych Mykytiuk, Kyiv (UA)

(73) Assignee: Unique Equipment Solutions LLC, Littleton, MA (US)

( * ) Notice: Subject to any disclaimer, the term of this patent is extended or adjusted under 35 U.S.C. 154(b) by 0 days.

(21) Appl. No.: 17/959,253

(22) Filed: Oct. 3, 2022

(65) Prior Publication Data

US 2023/0106698 A1 Apr. 6, 2023

Related U.S. Application Data

(63) Continuation of application No. 16/651,539, filed as application No. PCT/UA2018/000108 on Sep. 29, 2018, now Pat. No. 11,459,258.

(30) Foreign Application Priority Data

Sep. 29, 2017 (UA) .............. a 2017 09562

(51) Int. Cl.
| | | |
|---|---|---|
| C02F 9/00 | (2023.01) | |
| B01D 37/02 | (2006.01) | |
| C02F 1/00 | (2023.01) | |
| C02F 1/24 | (2023.01) | |
| C02F 1/28 | (2023.01) | |
| C02F 1/46 | (2023.01) | |
| C02F 1/461 | (2023.01) | |
| C02F 1/463 | (2023.01) | |
| C02F 1/465 | (2023.01) | |
| C02F 1/469 | (2023.01) | |
| C02F 1/72 | (2023.01) | |
| C02F 11/10 | (2006.01) | |
| C02F 101/00 | (2006.01) | |
| C02F 101/20 | (2006.01) | |
| C02F 101/32 | (2006.01) | |
| C02F 103/32 | (2006.01) | |
| C02F 103/36 | (2006.01) | |

(52) U.S. Cl.
CPC .............. *C02F 9/00* (2013.01); *B01D 37/02* (2013.01); *C02F 1/004* (2013.01); *C02F 1/24* (2013.01); *C02F 1/283* (2013.01); *C02F 1/285* (2013.01); *C02F 1/4608* (2013.01); *C02F 1/46109* (2013.01); *C02F 1/463* (2013.01); *C02F 1/465* (2013.01); *C02F 1/4693* (2013.01); *C02F 1/722* (2013.01); *C02F 1/725* (2013.01); *C02F 11/10* (2013.01); *C02F 2001/46142* (2013.01); *C02F 2101/006* (2013.01); *C02F 2101/20* (2013.01); *C02F 2101/32* (2013.01); *C02F 2103/322* (2013.01); *C02F 2103/365* (2013.01); *C02F 2303/04* (2013.01); *C02F 2303/16* (2013.01); *C02F 2305/023* (2013.01)

(58) Field of Classification Search
None
See application file for complete search history.

(56) References Cited

U.S. PATENT DOCUMENTS

| | | |
|---|---|---|
| 3,655,574 A | 4/1972 | Frischkorn |
| 3,966,400 A | 6/1976 | Birke |
| 4,162,975 A | 7/1979 | Adams |
| 4,648,964 A | 3/1987 | Leto |
| 4,783,253 A | 11/1988 | Ayres |
| 5,128,068 A | 7/1992 | Lahoda |
| 5,529,928 A | 6/1996 | Ciampi |
| 6,524,974 B1 | 2/2003 | Sukharev |
| 10,766,871 B2 | 9/2020 | Madenjian |
| 11,459,258 B2 * | 10/2022 | Mykytiuk ............... C02F 1/463 |
| 2013/0039872 A1 | 2/2013 | Daute |
| 2013/0317246 A1 | 11/2013 | Kreidler |
| 2014/0216946 A1 | 8/2014 | Milner |

FOREIGN PATENT DOCUMENTS

| | | |
|---|---|---|
| CN | 104496090 A | 4/2015 |
| RU | 2328455 C2 | 7/2008 |
| RU | 2396217 C2 | 8/2010 |
| RU | 165911 U1 | 11/2016 |
| UA | 111278 | 10/2016 |

* cited by examiner

*Primary Examiner* — Chester T Barry
(74) *Attorney, Agent, or Firm* — Loginov & Associates, PLLC; William A. Loginov

(57) ABSTRACT

The invention relates to the methods for sewage treatment contaminated by mechanical impurities, fats, proteins and other organic and inorganic compounds, and can be used for purification and water disinfection contaminated by heavy and radioactive metals, saturated or unsaturated fats, filtrate from landfills, meat processing plants, and/or oil and petroleum. The method includes flotation, electrocoagulation and filtration, and provides: mixing water with carbon-based sorbent; filtration of water and carbon sorbent on rubber-based hydrophobic sorbent; decomposition of organic substances accumulated on carbon and rubber sorbents; floatation with hydrogen peroxide; recovery active substance in hydrogen peroxide; reuse thereof; electrocoagulation with water saturation with oxygen and hydrogen, formed on indispensable carbon or metal electrodes based on the of aluminum, titanium, sodium, tin, copper, and other metals; water disinfection by electro-cavitation; generation of active substance based on the iron and titanium atoms; water filtration on the precoat filter; and filtering on activated carbon filter.

15 Claims, No Drawings

SYSTEM FOR TREATMENT AND DISINFECTION OF INDUSTRIAL EFFLUENTS

RELATED APPLICATIONS

This application is a continuation of co-pending U.S. patent application Ser. No. 16/651,539, entitled THE METHOD FOR TREATMENT AND DISINFECTION OF INDUSTRIAL EFFLUENTS, filed on Mar. 27, 2020, which is a U.S. National Phase of PCT International Application, Serial No. PCT/UA2018/000108, entitled THE METHOD FOR TREATMENT AND DISINFECTION OF INDUSTRIAL EFFLUENTS, with international filing date Sep. 29, 2018, the entire disclosure of each of which applications is herein incorporated by reference.

FIELD OF THE INVENTION

The invention relates to the area of treatment for effluents contaminated with mechanical inclusions, fats, proteins and other organic and inorganic compounds and can be used for the treatment and water disinfection contaminated with heavy and radioactive metals, saturated or unsaturated fats, filtrate from landfills for solid household waste, disposals of meat processing plants and water contaminated with oil and petroleum products.

BACKGROUND OF THE INVENTION

The "Method of electrochemical water decontamination" is known to include its treatment in the anode and cathode chamber of the diaphragm electrolyzer, with the anode camera operating in flow mode, and the cathode camera operating in non-flow mode. (Patent of Ukraine No. 111278)

The disadvantage of the method is that the method involves only electrochemical water disinfection, due to this, has a narrow range of applications.

The closest to the claimed invention is: "The method of electrochemical meat plants sewage purification", which includes electrocoagulation in an electrolyzer with soluble electrodes, coagulation with denaturation of proteins, and flotation. In this case, before electrocoagulation, the protein-fatty waste is purified from mechanical inclusions and not emulsified fats and mixed with drained manure, pre-purified from mechanical inclusions. After this, the average runoff from pH 5.6-6.0 is processed in an electrocoagulator with iron electrodes at oxygen saturation up to 2-4 mg/l, then with hydrogen peroxide, lime, flocculant, and the sludge is removed by settling and filtration, with filtrate treated with an electric flotator at a pH of 9-10, simultaneously feeding hydrogen peroxide. After the sludge removal, the waste is treated with sodium hypochlorite and is sequentially filtered through a carbon-loaded filter, cation-exchange and anion exchange filters. (Patent of the Russian Federation No. 2396217).

The disadvantage of the known method is that the technical solution can be used only for the treatment of sewage from meat plants and does not allow to reduce the concentration of heavy and radioactive metal ions in water, and leads to waste formation that needs to be disposed at the landfill. The method does not include water disinfecting.

SUMMARY OF THE INVENTION

The purpose of the invention is to improve the method of treatment and disinfection for industrial effluents and to expand the scope of its application, namely: to reduce the concentration of organic substances, heavy and radioactive metal ions in water, to increase the efficiency of removal fats of vegetable or animal origin, of oil or petroleum products from the contaminated water and to achieve disinfection for the purified water.

The technical result of the claimed invention is that the application of new materials, in combination with the known purification techniques for contaminated water, can reduce the concentration of organic substances, heavy and radioactive metal ions in water, achieve the complete removal of fats of vegetable or animal origin, oil or petroleum products from contaminated water, and to achieve decontamination of purified water.

DETAILED DESCRIPTION

The task of the present invention is solved by using a purification and disinfection method for industrial effluents, which, in addition to the flotation, electrocoagulation and filtration stage, includes the following steps:

mixing water with carbon-based powder hydrophobic sorbent of high absorbing capacity for saturated, unsaturated fats, oil and petroleum products and accumulation of pollutants on a hydrophobic sorbent;

filtration of a water suspension and a carbon sorbent on a rubber-based hydrophobic sorbent;

decomposition of saturated and unsaturated fats, oil, petroleum products and other organic substances accumulated on carbon and rubber sorbents, in the form of foam and solid organic particles, by pyrolysis without oxygen to carbon monoxide;

floatation in the flow mode adding hydrogen peroxide and saturating water with oxygen formed during the decomposition of water and hydrogen peroxide molecules on the active substance particles based on the aluminum, titanium, sodium, and other metals atoms, which is a catalyst for the process of molecules decomposition with the OH— and O— ions formation, simultaneously absorbs organic molecules and ions of heavy metals removing foam, followed by its utilization during the spent sorbents regeneration;

regeneration of the active substance with hydrogen peroxide and directing it for reuse;

flow mode electrocoagulation with water saturation by oxygen and hydrogen, which is formed on indispensable carbon or metal electrodes and on an active substance based on the aluminum, titanium, sodium, and other metals atoms, which adsorbs organic compounds on its surface and generates OH—, O— ions under normal pressure with foam removal;

water decontamination by electrocavitation, which is formed by high-voltage discharges in the medium of iron and copper particles or iron- and copper-based alloys, with titanium diode electrodes, and the generation of the active substance based on the iron and titanium atoms for further organic matter oxidation, decomposition in the flow of organic matter preferably by OH— and O— ions with hydrogen peroxide and active substance based on the iron, titanium, copper, sodium, and other metals with calcium oxide (CaO) and then activated charcoal filter at high pressure;

water filtration on a precoat filter under pressure to remove more than 5 microns solid and colloidal particles from water, using kieselguhr as a substrate and an active substance based on aluminum, titanium, copper, and sodium as an precoat membrane;

electrodialysis under pressure to reduce the ions level in water; and water filtration on activated charcoal filter.

The decomposition of pollutants on carbon and rubber sorbents by pyrolysis is carried out using microwave energy and the conversion of organic compounds to the synthesis gas (CO, $H_2$), followed by the use of synthesis gas for the thermal and electric energy generation. The ratio of the particle surface for the active substance based on the aluminum, titanium, sodium, iron atoms, which are the catalyst for the decomposition of molecules with the formation of OH— and O— ions, to the weight of their particles is more than 50, with a large volume of micro and mesopores. Adding from 1 to 20 ml/1 of hydrogen peroxide to water, the ratio for the active substance is in the range from (1:0.5) to (1:5).

Electrolysis of water in flotation reactors with an active substance based on the aluminum, titanium, sodium, iron and hydrogen peroxide atoms is carried out on metal electrodes (stainless steel, copper, aluminum) or carbon material, with a direct current of 3 to 240 V and the current density on the electrodes within the range from A/cm2 to 2 A/m2.

Water disinfection is carried out in an electrochemical reactor of a specially designed structure with ultraviolet radiation, ultrasonic waves, cavitation waves, which are formed in the reactor by direct current pulses in the range from 300 to 3000 V on titanium electrodes loaded into the intercolectric space of metal particles (iron, aluminum, copper separately or in combination in different proportions) in the size from 3 mm to 10 mm, which generates the formation of active substance from 0.1 mg/l to 30 mg/l based on the iron, copper, aluminum, titanium oxides with or without the addition of NaCl into the reactor in concentration of 0.5 g/l to 30 g/l, adding or not adding hydrogen peroxide in concentration of 0.5 ml/1 to 10 ml/1. Oxidation of organic matter residues is carried out in a high-pressure reactor, with pressures ranging from 3 to 10 atm.

Significant features of the invention are the following:
the use of carbon-based powder hydrophobic sorbent with a high absorption coefficient for saturated and unsaturated fats, oils and petroleum products from water, with its own formula for the removal of the above-mentioned substances from water;

the use of a hydrophobic rubber-based sorbent to separate the suspension into water and powder sorbent with accumulated saturated and unsaturated fats, oil and petroleum products, removal of solid particles with the size of more than 1 mm, removal of other solvents interacting with rubber;

conversion of saturated and unsaturated fats, oil and petroleum products, solvents and solid organic particles removed from water into synthesis gas used to generate thermal and electric energy for technological needs in a reactor of its own design using microwave energy;

the removal of other organic compounds in colloidal form and of heavy and radioactive metals ions at the flotation stage in the presence of the active substance of its own formula and hydrogen peroxide in the flotator of its own design, in a flow mode;

the oxidation of organic matter remaining in water with OH— and O— ions, preferably under pressure in the presence of an active substance of its own formula and hydrogen peroxide, with the increased pressure generated by oxygen, which is obtained from water and hydrogen peroxide molecules in the presence of the active substance in reactor of its own design, with periodic electrolysis of water on non-inverting carbon electrodes;

the oxidation of organic matter with OH— and O— ions, preferably under pressure, in the presence of activated carbon, calcium oxide and hydrogen peroxide, with the increased pressure generated by oxygen, which is generated from water and hydrogen peroxide molecules in the presence of the active substance in the reactor of its own design;

the water disinfection by OH— and O— ions, ultraviolet radiation, ultrasonic radiation, cavitation waves, which are generated in the electrocavitation process, created by the high-voltage pulses generator in the reactor of its own design;

the removal of solid particles with the size of more than 5 microns, heavy and radioactive metals oxides, on a precoat filter under pressure using kieselguhr and an active substance of its own formula as an precoat membrane;

the reduction of the ions level in water by electrodialysis; and the installation of equipment in standard size containers.

The technical result of the claimed invention is that the application of new materials in combination with known techniques for purification of contaminated water can reduce the concentration of organic substances, heavy and radioactive metal ions in water and remove fats of vegetable or animal origin, petroleum or petroleum products from contaminated water. The essential features of the present invention allow the purification for the water contaminated with organic compounds, heavy and/or radioactive metals and their decontamination with minimal application of electrical energy by using the active substance and hydrogen peroxide to generate OH— and O— ions, which are the main oxidants, to form a high pressure in the system by the emitted gases, and for the generation of thermal and electric energy, using the synthesis gas formed during the decomposition of organic pollutants as a fuel and regeneration of spent carbon sorbents.

Another technical result is that the efficiency of treatment for highly contaminated water is achieved by the application of the active substance and hydrogen peroxide to generate OH— and O— ions, mainly due to the use of gases generated for increasing the pressure, reducing the time of water purification due to the oxidation of organic compounds under elevated pressure, reuse of sorbents and activated carbon after their regeneration, placing equipment in standard sizes containers, which significantly reduces the cost for preparing premises and equipment installation.

The method is implemented as follows. The removal of fats of plant and/or animal origin, oil and/or petroleum products, saturated and unsaturated fats from contaminated water, which is a stable water-fat emulsion, is carried out by forming a suspension of water and a carbon-based powder hydrophobic sorbent in the rate of 1 to 10 g per one liter of water, the subsequent mixing of the suspension with a hydrophobic rubber-based sorbent, filtration of a water suspension and sorbents on a rubber-based sorbent on one or more specially designed filters and the supply of water free from saturated and unsaturated fats, including oil and petroleum products (the degree of purification from fats and petroleum products reaches 99.9%) into the flotation reactor. Regeneration of spent sorbents with accumulated fats and petroleum products in one or more sorbent regeneration reactors and the conversion of exhaust gases with microwave sources, conversion of the exhaust gases into the synthesis gas, which is a fuel for obtaining electric and thermal energy at the cogeneration plant, reusing of regenerated sorbents for the removal process of saturated and unsaturated fats, including oil and petroleum products from contaminated waters. Removal in two or more flotation reactors with foam up to 80% of organic substances from water, which is achieved by adding to water the active substance of a special formula based on the of aluminum, titanium, sodium, iron atoms with a ratio of surface area to particle weight more than 50. The size of the micro- and mesopores, for the concentration from 0.1 to 20 g/l in the reactor, and the addition from 0.5 to 10 ml/1 of hydrogen peroxide to water (60% of the total volume required for full oxidation of the organic component) in relation to the active substance in the range from (1:0.5) to (1:5) in combination with electroflotation under atmospheric pressure in a reactor of a special design, while the active substance remains in the reactor until it is saturated with heavy and/or radioactive metals, while water changes constantly. The oxidation of organic matter in the flotation reactors, which remains in the dissolved state in water, predominantly by OH— and O— ions, which are formed from the decomposition of water and hydrogen peroxide molecules on the surface of an active substance absorbing organic molecules and generating OH— and O— ions on its surface that react with nearby organic molecules, the reaction proceeds with the formation of free radicals of organic molecules, which are active and enter the recombination reaction between themselves and deeper oxidation in the reaction with the OH— and O— ions. The oxidation of heavy and radioactive metal ions in flotation reactors mainly by OH— and O— ions, which are formed from the decomposition of water and hydrogen peroxide molecules on the surface of an active substance absorbing heavy and radioactive metal ions and generates on its surface OH— and O— ions, which react with adjacent ions, and the absorption of the products by the active substance, which is removed after saturation with molecules that include metal atoms. Electrolysis of water in flotation reactors in the presence of an active substance based on the aluminum, titanium, sodium, iron atoms and hydrogen peroxide, metal electrodes (stainless steel, copper, aluminum) or carbon material in a special reactor with a direct current voltage of 3 to 240 V and current density on electrodes within the range of 0.01 to 2 A/m2, which generates an additional number of OH— ions, 0 molecules and other active substances accelerating the oxidation rate for organic molecules and reducing the residence time of the water in the flotation reactor, with subsequent separation of the active substance from water in an electric filter of a special construction. Water disinfection in one or more electrochemical reactors of a special construction with ultraviolet radiation, ultrasonic waves, cavitation waves, which are formed in water by direct current pulses in the range from 300 to 3000 V to three titanium electrodes (two positive and one negative) in the reactor with metal or metals particles loaded in between the electrode space (iron, aluminum, copper separately or in combination in different ratios) in the size from 3 to 10 mm, which generates from 0.1 to 30 mg/l of the active substance based on the iron, copper and aluminum, titanium oxides, with or without addition of NaCl in a concentration of 0.5 to 30 g/l, with or without the addition of hydrogen peroxide in the range of 0.5 to 10 ml/1. Oxidation of organic matter residues in two or more high pressure reactors by their oxidation with OH—, O— and $O_2$ molecules, which are formed from the decomposition of water and hydrogen peroxide molecules on the surface of an active substance absorbing organic molecules and generating OH— and O— ions on its surface, which react with nearby organic molecules, the reaction proceeds with the formation of free radicals of organic molecules which are active and enter the recombination reaction between themselves and deeper oxidation due to the reaction with the OH—, O— ions under high pressure, and the pressure in the reactor increases due to the release of the active oxygen (preferably), which is dissolved in water under high pressure, at pH of less than 4 and pressure in the range from 3 to 10 atm, in the presence of hydrogen peroxide (20% of total required volume) in relation to the active substance in the range from (1:0.5) to (1:5) when the active substance is separated from the water by filtration of the sediment on the kieselguhr filter in the process of water overflow into the next reactor of elevated pressure. Oxidation of the organic matter remaining in water in two or more high pressure reactors in the range from 2 to 10 atm, on activated carbon with reactor filling of 60-90% by volume in the presence of hydrogen peroxide (20% volume) under high pressure maintained by water pressure from a previous high pressure reactor and additionally generated by active oxygen released at pH over 6, the pH of the solution is regulated by adding calcium oxide to meet the required pH level from previous level. Further water filtration is performed on one or more precoat filters using kieselguhr as a filter element to remove solid particles larger than 5 microns. If necessary, further water purification from metal ions and nonmetals is carried out by dialysis in one or more reactors and, if necessary, further water filtration in one or more charcoal filters. Then the reactors are filled with water, the time of water in each of the reactors, the water level in the reactors, the rate of water supply on the filters and in the electrochemical reactor, the foam removal is regulated and controlled by an automatic control system for the process with given, for a certain water parameters, such as pH, the reaction time, the amount of active substance, the hydrogen peroxide amount, the amount of calcium oxide, the rate of water supply, Total Dissolved Solids (TDS), Reduction-oxidation reaction (RedOx), etc.

What is claimed is:
1. A system for treatment and disinfection of at least organic pollutants in water effluent comprising:
   an aqueous suspension by mixing the effluent with a hydrophobic carbon-based sorbent in powder form capable of absorbing the organic pollutants;
   a carbon-based sorbent that absorbs at least some of the organic pollutants to form a pollutant-laden carbon-based sorbent;
   a filter that separates solid particles, including the pollutant-laden carbon-based sorbent, from water in the effluent by filtering the aqueous suspension through a volume of rubber-based hydrophobic sorbent to, thereby, produce treated water that is substantially free of organic pollutants,
   wherein the filter is arranged to absorb at least some of the organic pollutants on the rubber-based sorbent to form pollutant-laden rubber-based sorbent;
   means for pyrolytically decomposing, free of oxygen, the pollutant-laden carbon-based sorbent and the pollutant-laden rubber based sorbent to synthesis gas comprising carbon monoxide and hydrogen;
   means for performing froth flotation to generate a foam, including adding hydrogen peroxide to the treated water in presence of a metal catalyst so as to allow absorbing of organic pollutants;

non-sacrificial carbon or metal electrodes, and sacrificial metal electrodes that perform electrocoagulation on the treated water;

means for performing water disinfection by electrocavitation, which is formed by high-voltage discharges in a medium of iron and copper particles, or alloys based upon iron and copper particles, with disintegrating titanium electrodes;

means for performing further oxidation of organic matter in the treated water based on organic matter oxidation, decomposition of the organic matter being performed thereby in a continuous manner in the presence of hydrogen peroxide and iron, titanium, copper, sodium, or other metal atoms with calcium oxide (CaO) and activated carbon in a high pressure reactor; and means for filtering water on a precoat filter under pressure to remove solid and colloidal particles of more than 5 microns from water, wherein a substrate of the filter comprises kieselguhr and the filter includes a precoat membrane having at least one of aluminum, titanium, copper, and sodium, wherein ions are removed from the treated water by an electrodialysis step, and wherein the treated water is filtered through an activated carbon filter.

2. The system of claim 1, wherein at least part of the organic pollutants are removed from the water effluent by adding the carbon and rubber sorbents, followed by cleavage of the removed organic pollutants by pyrolysis using the microwave radiation energy, and conversion thereof to a combustible synthesis gas.

3. The system of claim 1, wherein the synthesis gas is arranged to generate thermal and electric energy.

4. The system of claim 1, wherein the oxidation takes place on the surface of the organic matter based on the aluminum, titanium, sodium, iron atoms which are a catalyst.

5. The system of claim 1 wherein, at least one of (a) the foam is disposed of, and (b) the metal catalyst is separated from the treated water for reuse by the system.

6. The system of claim 1, further comprising a flotation reactor in which the electrocoagulation of the treated water occurs.

7. The system of claim 1 wherein the non-sacrificial electrodes and the sacrificial electrodes are provide a direct current voltage of 3 to 240 V and a current density within the range of 0.01 to 2 A/m2.8.

8. The system of claim 1, further comprising an electrochemical reactor that carries out the disinfection of the treated water by at least one of ultraviolet radiation, ultrasonic waves and cavitation waves.

9. The system of claim 8 wherein direct current pulses are applied to titanium electrodes in a range from 300 to 3000 V in the electrochemical reactor.

10. The system of claim 9 wherein an inter-electrode space, between the titanium electrodes includes metal particles in size from 3 mm to 10 mm.

11. The system of claim 10 wherein the metal particles are at least one of iron, aluminum, copper, and combinations thereof.

12. The system of claim 9 wherein the titanium electrodes include two positive electrodes and one negative electrode.

13. The system of claim 1 wherein NaCl, in a concentration of 0.5 to 30 g/l, is added to the high pressure reactor.

14. The system of claim 1 wherein the hydrogen peroxide in the high pressure reactor defines a concentration from 0.5 to 10 ml/liter.

15. The system of claim 1 wherein the oxidation of the organic matter occurs with activated carbon, active substance and hydrogen peroxide in the high pressure reactor, with a pressure from 2 atm to 10 atm.

* * * * *